UNITED STATES PATENT OFFICE.

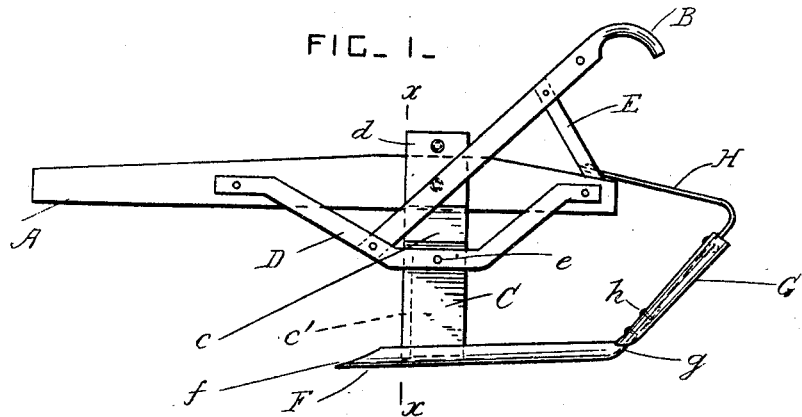
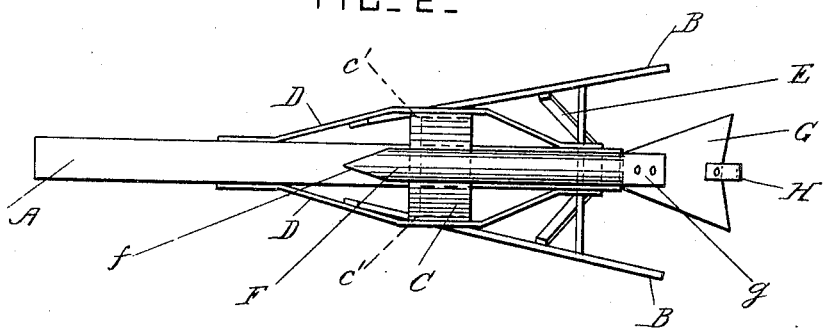
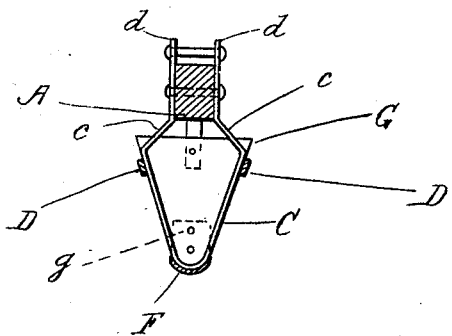

DANIEL W. DENNY AND HENRY L. RADER, OF TARRYALL, COLORADO.

DITCHING-PLOW.

No. 799,637.      Specification of Letters Patent.      Patented Sept. 19, 1905.

Application filed April 8, 1905. Serial No. 254,575.

*To all whom it may concern:*

Be it known that we, DANIEL W. DENNY and HENRY L. RADER, residing at Tarryall, in the county of Park and State of Colorado, have invented certain new and useful Improvements in Ditching-Plows; and we do hereby declare the following to be a full, clear, and exact description of the invention, such as will enable others skilled in the art to which it appertains to make and use the same.

This invention relates to plows used for forming ditches for irrigating and draining land; and it consists in the novel construction and combination of the parts hereinafter fully described and claimed.

In the drawings, Figure 1 is a side view of the plow. Fig. 2 is a plan view of the plow from below. Fig. 3 is an end view showing the plow-beam in cross-section on the line $xx$ in Fig. 1.

A is the plow-beam, which is of any approved form, and B represents handles for guiding the plow.

C is a wedge-shaped loop formed of a plate of flat sheet metal. The apex of the loop is rounded and is arranged downward, and the upper part of the loop is provided with inclined portions $c$ and parallel portions $d$, which are secured to the opposite sides of the plow-beam. Cutting edges $c'$ are formed on the loop C.

D represents two curved brace-bars, the end portions of which are secured to the plow-beam. The middle portions of these brace-bars are secured to the upper and widest part of the wedge-shaped loop C by rivets or bolts $e$. The guiding-handles are also preferably secured to these brace-bars in front of the said loops, and E is a brace between the upper end portions of the handles and the rear end portion of the plow-beam.

F is a trough-shaped cutter having a pointed front end $f$. The front end portion of the cutter is secured to the rounded bottom end portion of the loop C, and the rear end portion $g$ of the cutter is inclined upwardly and rearwardly and secured to a wedge-shaped blade G. This blade is similar in shape to the wedge-shaped loop C and it is arranged behind it in inclined position. The side portions of the blade G are inclined rearwardly, so that its front surface is convex. The blade is secured to the part $g$ by any approved rivets or bolts $h$, and H is a brace secured to the upper and rear end portion of the blade at one end and to the plow-beam at the other end. The trough-shaped cutter F is straight for its entire length and is arranged with its pointed end slightly below the level of its rear end.

The plow is drawn along in the usual manner of using a plow. The cutter F scoops or cuts a groove or ditch in the surface of the ground, and the blade G discharges the loose earth onto the ground upon each side of the said groove or ditch.

What we claim is—

1. In a ditching-plow, the combination, with a beam, of a wedge-shaped loop secured to the said beam, a straight trough-shaped cutter arranged in an inclined position and having its front end portion secured under the rounded bottom end of the said loop, a wedge-shaped discharging-blade having its lower end secured to the rear end of the said cutter, and a brace between the upper end of the said blade and the said beam.

2. In a ditching-plow, the combination, with a beam, of a wedge-shaped loop having converging inclined lower side portions, reversely-inclined upper portions and parallel top portions which are secured to the said beam, two brace-bars having their end portions secured to the said beam and their middle portions secured to the widest part of the said loop, a straight trough-shaped cutter arranged in an inclined position and having its front end portion secured under the rounded bottom end of the said loop, a wedge-shaped discharging-blade having its lower end secured to the rear end of the said cutter, and a brace between the upper end of the said blade and the said beam.

In testimony whereof we affix our signatures in presence of two witnesses.

DANIEL W. DENNY.
                 HENRY L. RADER.

Witnesses:
    DANIEL J. MCKAY,
    AUSTIN R. MOSES.